(12) United States Patent
Godwin et al.

(10) Patent No.: US 6,353,793 B1
(45) Date of Patent: Mar. 5, 2002

(54) SYSTEM AND APPARATUS FOR DETERMINING THE CENTER OF GRAVITY OF AN AIRCRAFT

(75) Inventors: Don S. Godwin, Oakridge; Kenneth D. Driver, Burlington, both of NC (US); Joseph C. Gray, Westminster, SC (US); Richard J. Gritter, Greensboro, NC (US)

(73) Assignee: Aero Modifications & Consulting, LLC, Greensboro, NC (US)

( * ) Notice: Subject to any disclaimer, the term of this patent is extended or adjusted under 35 U.S.C. 154(b) by 0 days.

(21) Appl. No.: 09/243,392

(22) Filed: Feb. 1, 1999

(51) Int. Cl.[7] ................................................ G01M 1/12
(52) U.S. Cl. ...................................... 701/124; 701/120
(58) Field of Search ........................... 701/16, 18, 120, 701/124

(56) References Cited

U.S. PATENT DOCUMENTS

| | | | |
|---|---|---|---|
| 2,336,142 A | 12/1943 | Watson | 73/65.06 |
| 2,425,685 A | 8/1947 | Pinder et al. | 73/65.06 |
| 2,540,807 A | 2/1951 | Berry | 73/65.06 |
| 2,929,679 A | 3/1960 | Bryan et al. | 235/61 A |
| 3,225,590 A | 12/1965 | Ward et al. | 73/65.06 |
| 3,584,503 A | 6/1971 | Senour | 73/65.06 |
| 3,701,279 A | 10/1972 | Harris et al. | 73/65.06 |
| 4,110,605 A * | 8/1978 | Miller | 701/124 |
| 4,463,428 A | 7/1984 | Gilliam | 701/124 |
| 4,502,555 A | 3/1985 | Gower | 177/25.14 |
| 4,507,742 A | 3/1985 | Bateman | 702/101 |
| 4,516,646 A | 5/1985 | Bergfalk | 177/211 |
| 4,574,360 A * | 3/1986 | Bateman | 702/174 |
| 4,639,872 A | 1/1987 | McHale et al. | 701/124 |
| 4,796,212 A | 1/1989 | Kitagawa | 702/101 |
| 4,935,885 A * | 6/1990 | McHale et al. | 702/175 |
| 4,949,269 A * | 8/1990 | Buisson et al. | 701/124 |
| 5,205,514 A | 4/1993 | Patzig et al. | 244/103 R |
| 5,521,827 A | 5/1996 | Lindberg et al. | 701/124 |
| 5,548,517 A | 8/1996 | Nance | 701/124 |
| 5,583,777 A | 12/1996 | Power | 701/124 |
| 5,646,376 A | 7/1997 | Kroll et al. | 177/211 |
| 6,032,090 A * | 2/2000 | Von Bose | 701/37 |

* cited by examiner

Primary Examiner—William A. Cuchlinski, Jr.
Assistant Examiner—Marthe Y. Marc-Coleman
(74) Attorney, Agent, or Firm—Womble Carlyle Sandridge & Rice, LLP; C. Robert Rhodes

(57) ABSTRACT

A method and apparatus for determining the center of gravity of an aircraft having a plurality of wheels includes the steps of determining the load on one of the plurality of aircraft wheels, determining the aircraft inclination with respect to level, relating the wheel load to the aircraft center of gravity based on the aircraft inclination. The load determination may be conducted on the aircraft nose wheel using a lever apparatus including a frame having a forward end and an aft end the aft end including an attachment device located at the aft end for providing detachable engagement with the wheel axle. The lever apparatus also includes a pivot arm having a first end and a second end, the first end pivotally attached to the frame at a pivot point located between the forward end and the aft end of the frame. A load cell is positioned on the frame so as to be engaged by the pivot arm as the pivot arm pivots about the pivot point for generating a signal indicative of the force generated on the frame as the wheel is raised. The lever apparatus operates about a fulcrum point located forward of the frame aft end about which the lever apparatus raises the aircraft wheel. A processor may be provided for receiving the load cell signal and determining wheel load.

40 Claims, 7 Drawing Sheets

SYSTEM AND APPARATUS FOR DETERMINING THE CENTER OF GRAVITY OF AN AIRCRAFT

FIELD OF THE INVENTION

The present invention relates to a system and method for determining the center of gravity of an object. More particularly, the invention relates to a system and method for determining the location of the center of gravity of an aircraft in a simple manner. The invention further relates to an apparatus for determining the weight or load on an aircraft nose wheel or point at which the aircraft is lifted.

BACKGROUND OF THE INVENTION

The location of the center of gravity of a loaded aircraft is a critical factor in determining whether the aircraft is safe for flight. Determining the location of the center of gravity (CG) is particularly important for cargo transport aircraft. This is because the loads carried by such aircraft may vary significantly from flight to flight in terms of load weight distribution. The CG for a given aircraft must be maintained within a certain range for a given load as specified by the aircraft manufacturer and/or the Federal Aviation Administration. One method for determining CG manually would be to determine the weight at a series of points along the aircraft's length to calculate the moment developed about a given reference line. These moments are then summed and divided by the total weight of the aircraft and the load to determine the point at which the plane is balanced. This point is the aircraft CG. Aircraft CG is sometimes expressed in terms of percentage mean aerodynamic chord (%MAC).

Because this method, if done manually, would be tedious, time consuming, and expensive, a variety of systems and devices have been devised to determine aircraft CG. Many of these systems use strain gauges mounted in the oleo struts that support the aircraft. The amount of strain in the struts can be related to the force on the struts and therefore aircraft weight. Data concerning the weight at each of the aircraft wheels can be related to aircraft center gravity. Other systems have relied on pressure transducers in fluid communication with landing gear hydraulic systems. One of these requires a separate pump to cycle each oleo strut between a near fully extended position and a near fully retracted position while recording a series of pressure measurements. The pressure measurements are then related to weight on the strut.

These systems have not been without their problems, however. As these struts age due to the wear and tear of daily use, the strain gauge or pressure readings may become unreliable. This stems from friction in the landing gear struts and hydraulic system leaks. Moreover, the strain gauge systems may suffer from a high noise to signal ratio in the information provided by the strain gauges.

There remains a need then for a simple, low cost system for determining aircraft CG. The system should minimize the need for costly electronic components that must stand up to the environmental rigors to which aircraft landing gear are subjected. Desirably, such a system should be separable from but transportable with the aircraft, should not require any type of expensive hydraulic system interface and should be simple to operate.

SUMMARY OF THE INVENTION

The present invention relates to a method, system and apparatus for determining the center of gravity of an aircraft, particularly, smaller aircraft not otherwise provided with equipment for such determination. By determining the load applied to a known point on the longitudinal axis of the aircraft necessary to lift the front or rear end of the aircraft (preferably the nose wheel in a tricycle wheel arrangement), aircraft CG is determined. The invention provides a simple lever apparatus for lifting the nose or tail from the ground and measuring the reactive load thus generated in the lever. By summing the moments about the reactive load point and then about the lever fulcrum, the nose wheel load can be related to aircraft CG. This process must take into account aircraft inclination to provide accurate results.

The present invention further relates to an apparatus for determining the load necessary to lift the aircraft at a selected point on the longitudinal axis. The apparatus includes a frame having a forward end and an aft end, the aft end adapted for detachable engagement with a jack point or wheel. A pivot arm having a first end and a second end is pivotally attached at its first end to the frame at a pivot point located between the forward end and the aft end of the frame. A load cell is positioned on the frame so as to be engaged by the pivot arm as the pivot arm pivots about the pivot point for generating a signal indicative of the force generated on the frame as the aircraft is raised. The lever and frame constitute a lever having a fulcrum point located forward of the selected point. A load processor is provided for receiving the load cell signal and converting the signal to load data. The processor may include a display device for displaying the amount of wheel load. The apparatus may be used as a tow bar when not being used to determine wheel load.

The invention further relates to a method for determining the longitudinal center of gravity of an aircraft having a plurality of landing gear wheels. The method includes determining the load applied to a point on the aircraft so as to raise one of the landing gear wheels from the ground and determining total aircraft weight. This load is then related to the aircraft center of gravity so as to determine the longitudinal position of the aircraft center of gravity.

Assuming the aircraft is substantially level and includes a nose wheel and a laterally spaced apart main landing gear, the load on the nose wheel can be related to the aircraft center of gravity location according to the relationship:

$$L_m = L/(1+(P_m/P_n))$$

where

L equals the horizontal distance between the nose wheel and the main landing gear;

$L_m$ equals the horizontal distance between the center of gravity and the main landing gear;

$P_m$ equals the load on the main landing gear; and $P_n$ equals the load on the nose wheel.

However, CG determination must oftentimes be made when an aircraft is not level, but inclined slightly downwardly from the main landing gear forwardly. Where the aircraft is inclined at an angle of inclination and includes a nose wheel and a laterally spaced apart main landing gear, the load on the nose wheel can be related to the aircraft center of gravity location according to the relationship:

$$L_m = \frac{P_n L}{(WT)\cos^2\theta} + L_{cm}\tan\theta$$

where
- WT equals total aircraft weight;
- $P_n$ equals aircraft nose wheel load;
- $\theta$ equals aircraft inclination;
- L equals the horizontal distance between center of nose wheel and landing gear;
- $L_{zm}$ equals the vertical position of CG above the main landing gear wheel axle; and
- $L_m$ equals the horizontal distance between CG and main landing gear.

The invention further relates to a method for determining the longitudinal center of gravity of an aircraft having a nose wheel and laterally spaced apart main landing gear wheels including measuring the aircraft inclination; determining total aircraft weight; measuring the horizontal distance between the center of the nose wheel and the main landing gear wheels; attaching a lever apparatus to the nose wheel axle; lifting the nose wheel from the ground using the lever apparatus by applying a force to one end of the apparatus; measuring the reactive load at a point along the length of the lever apparatus; relating the measured reactive load to the load on the nose wheel to determine aircraft nose wheel load; and relating the nose wheel load to aircraft center of gravity according to the relationship described above.

The present invention also relates to a system for determining the center of gravity of an aircraft having a plurality of landing gear wheels. The system includes a lever apparatus for determining the load on one of the plurality of aircraft wheels including:

i. a frame having a forward end and an aft end, and adapted for detachable engagement with one of the plurality of aircraft wheels;

ii. a fulcrum point about which the lever apparatus raises the aircraft wheel;

iii. a load cell mounted on the frame and adapted to generate a signal indicative of the reactive force generated on the frame as the wheel is raised.

The system further includes a processor for receiving flight data and the load cell signal, determining wheel load, determining aircraft inclination, and relating wheel load, aircraft inclination and flight data to aircraft center of gravity.

The present invention further relates to an apparatus for determining the load on an aircraft wheel having a wheel axle including a lever apparatus having a forward end and an aft end, the aft end adapted for detachable engagement with an aircraft wheel axle. The lever apparatus in includes a fulcrum point spaced laterally apart from the wheel axle. A load cell is mounted on the frame so as to generate a signal indicative of the reactive force generated on the frame at a point between the forward end and the aft end as the wheel is raised responsive to a force applied to the forward end. The apparatus further includes a wheel load processor for receiving the load cell signal and determining aircraft wheel load.

In an alternative embodiment, the apparatus may further include a pivot arm having a first end and a second end, the first end pivotally attached to the lever apparatus at a pivot point located between the forward end and the aft end of the apparatus. The apparatus and the pivot arm thus define a lever for raising the wheel so that the load cell is engaged by the pivot arm.

One aspect of the present invention is to provide a simple apparatus for determining aircraft CG that may be operated by one person and that may be stowed on an aircraft when not in use.

Another aspect of the present invention is the to provide an apparatus for determining aircraft CG that eliminates the need for multiple, landing gear-mounted load cells.

Still another aspect of the present invention is to provide method for determining aircraft CG that accounts for aircraft inclination.

A further aspect of the present invention is the provision of a tow bar that may also serve duty as a lever apparatus for determining aircraft CG.

These and other aspects of the present invention will become apparent to those skilled in the art after a reading of the following description of the preferred embodiments when considered in conjunction with the drawings.

DESCRIPTION OF THE PREFERRED EMBODIMENTS

Figure 1:
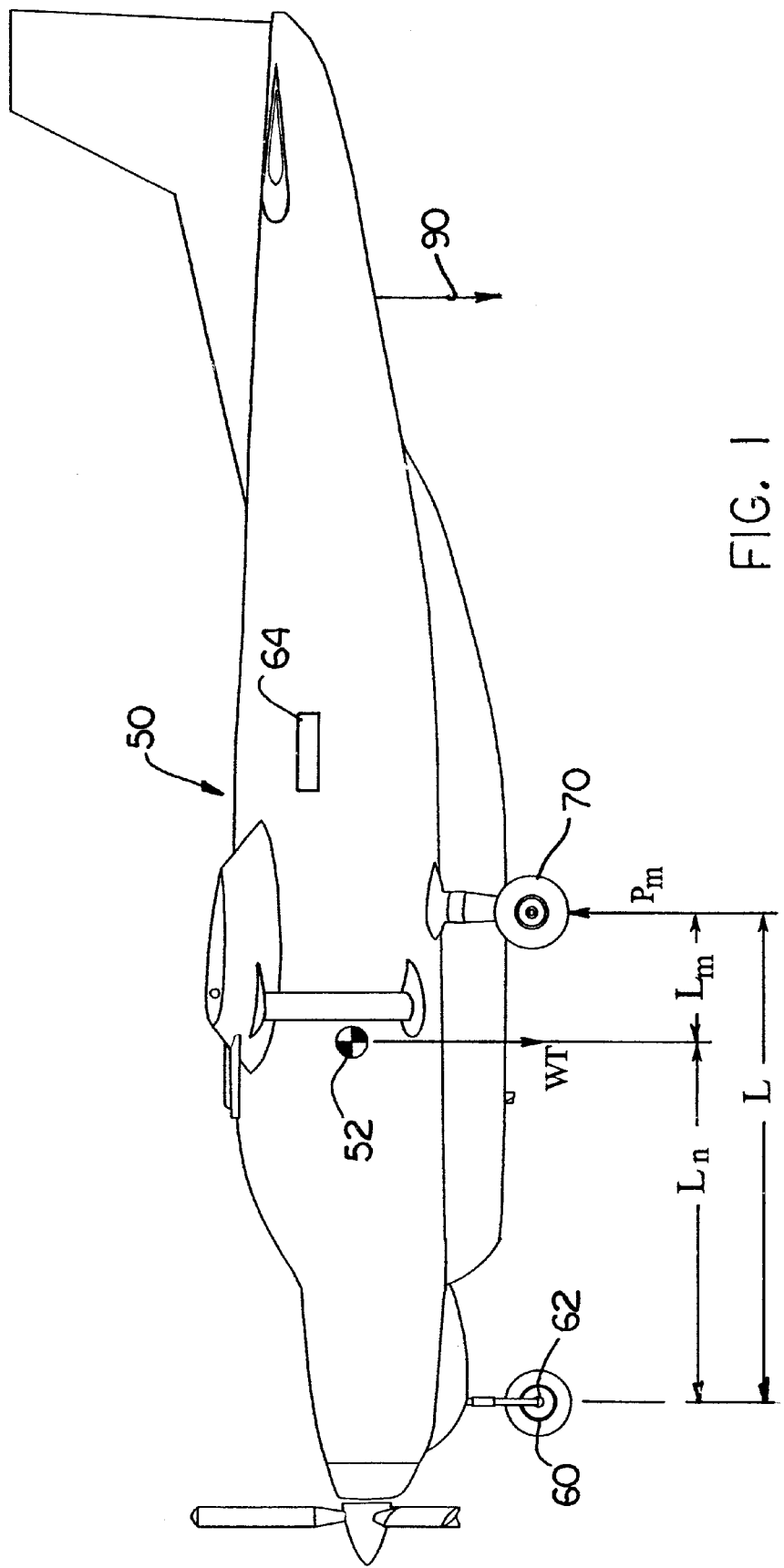
FIG. 1 is a free body diagram for a level aircraft.

In the preferred embodiment of the present invention illustrated in FIGS. 1–7, like reference characters designate like or corresponding parts throughout the several views. The present invention will be described by first discussing the mathematical basis for determining longitudinal aircraft CG based primarily on the load measure on a selected point on the aircraft, preferably an aircraft wheel, and particularly a nose wheel. Next, a preferred embodiment of a suitable lever apparatus for determining the weight on an aircraft nose wheel and method for converting that information into aircraft CG location will be described.

Center of Gravity Analysis

The present invention is particularly suited for use with small cargo aircraft such as the Cessna 208B. However, the present invention may be used with other types of aircraft of a wide variety of sizes. With suitable structural modifications and component selection, the present invention also may be used with much larger aircraft.

Turning now to FIG. 1, there is illustrated schematically a level aircraft 50. For a typical small cargo aircraft, the landing gear is arranged in a tricycle arrangement. The term "tricycle" refers to an aircraft of the type having a landing gear arrangement including a pair of transversely spaced apart main landing gear units 70 and a third ground support member that may be a nose wheel 60. The third ground support member typically is located substantially on the longitudinal axis of the aircraft forward or aft of the main landing gear units 70. If the third ground support member is located aft of the main landing gear 70, then it may comprise a strut.

Nose wheel 60 rotates about a horizontal axle 62. Because a side view of the aircraft is shown in FIG. 1, only one of the sets of wheels making up main landing gear 70 is visible. Typically the main landing gear 70 includes multiple wheels or sets of wheels positioned on either side of the aircraft longitudinal centerline.

The aircraft 50 may also include an inclinometer 64 for measuring aircraft inclination and generating a signal indicative of that inclination. The inclinometer 64 may be positioned at any convenient point on the aircraft 50. Alternatively, the inclinometer 64 may include an electrical lead for providing the signal directly to a hand held device containing a display or directly to a microprocessor for determination of aircraft CG as discussed below. A suitable inclinometer for the practice of the present invention is the dual axis tilt monitor SSY0018 available from Spectron Systems Technology, Inc. of Hauppauge, N.Y.

Figure 6:
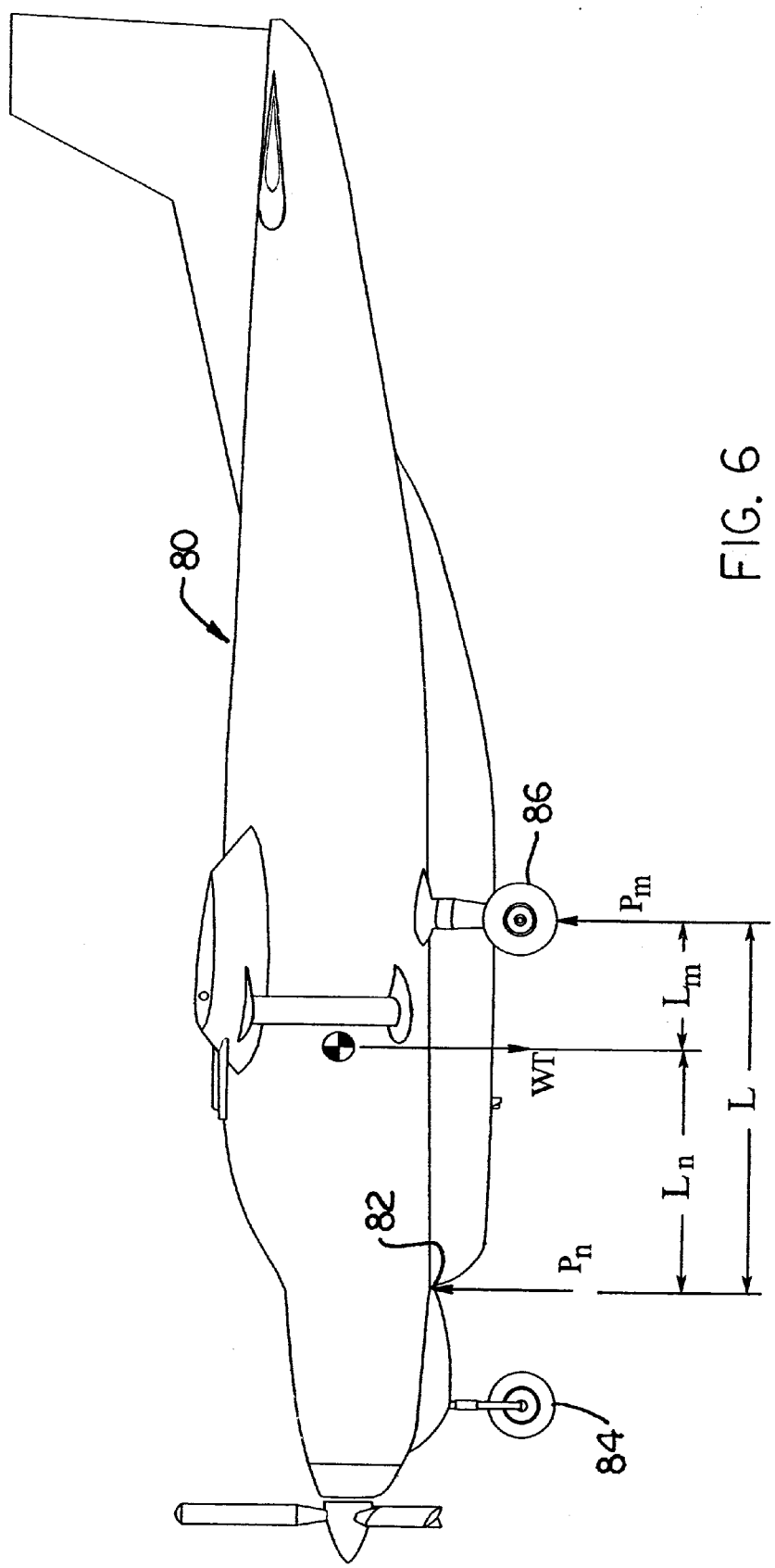
FIG. 6 is a schematic representation of aircraft CG being determined using a jack point located aft of the nose wheel.

FIGS. 1 and 6 are free body diagrams illustrating the forces acting on a level aircraft that is at rest on the ground. The diagrams show that if certain aircraft and load parameters are known, then aircraft CG can be determined by measuring the load applied at some point on the aircraft so as to raise one of the aircraft wheels from the ground. Although any point on the aircraft may be used to do so, desirably a point that is laterally spaced from the main landing gear 70, 86 is used. A particularly preferred lifting point is the aircraft nose wheel 60 as described in the following analysis.

The following legend is applicable to this analysis:

WT: total aircraft weight.

$P_n$: aircraft nose wheel weight $P_m$: aircraft main landing gear weight

L: horizontal distance between center of nose wheel and landing gear.

$L_n$: horizontal distance between CG and nose wheel.

$L_m$: horizontal distance between CG and main landing gear.

Total aircraft weight, WT, equals the sum of the load on the main landing gear $P_m$ and the load on the nose wheel, $P_n$. Also, the total distance between the nose wheel 60 and the main landing gear 70, L, is the sum of $L_m$ and $L_n$. Thus, $L_n = L - L_m$. It follows that the moments about the aircraft CG can be summed as follows:

$$\Sigma M_{CG}=0$$

$$P_m L_m = P_n L_n$$

This moment summation equation can be solved for the location of CG relative the main landing gear as follows:

$$L_m = \frac{P_n}{P_m}(L - L_m)$$

$$\frac{P_m}{P_n} = \frac{L}{L_m} - 1$$

$$L_m = \frac{L}{1 + \frac{P_m}{P_n}}$$

This equation will be referred to as the "level CG equation." It will be readily appreciated that $P_m$ can be determined using known information according to the relationship:

$$P_m = WT - P_n$$

FIG. 6 illustrates an alternative approach for this analysis wherein the weight on an aircraft "jack point" is used as the laterally spaced apart point. A "jack point" is understood in the art to mean a structurally reinforced point on an aircraft frame intended for use to raise the aircraft from the ground for maintenance purposes. For a small cargo aircraft of the type discussed above typically about 3 jack points are provided. In free body diagram of FIG. 6, the jack point 82 is located just aft of the nose wheel 84 and forward of the main landing gear 86. Desirably the jack point 82 is positioned on the lateral centerline of the aircraft 80. Nevertheless, the practice of the present invention includes using points removed a short lateral distance therefrom.

It will be readily appreciated that the specified dimensions in FIG. 6 correspond closely to those in FIG. 1. Notably, the following legend applies to FIG. 6:

WT: total aircraft weight.

$P_n$: aircraft nose wheel weight $P_m$: aircraft main landing gear weight

L': horizontal distance between the jack point and the main landing gear $L_n'$: horizontal distance between CG and the jack point $L_m'$: horizontal distance between CG and main landing gear The analysis above assumes that the aircraft is level. In other words, the analysis assumes that the aircraft longitudinal axis is parallel to the ground. In actual practice, this condition is rarely the case. While steps could be taken to level the aircraft, they require additional time and resources. Therefore, it is desirable to perform the analysis described above for an inclined aircraft.

Figure 2:
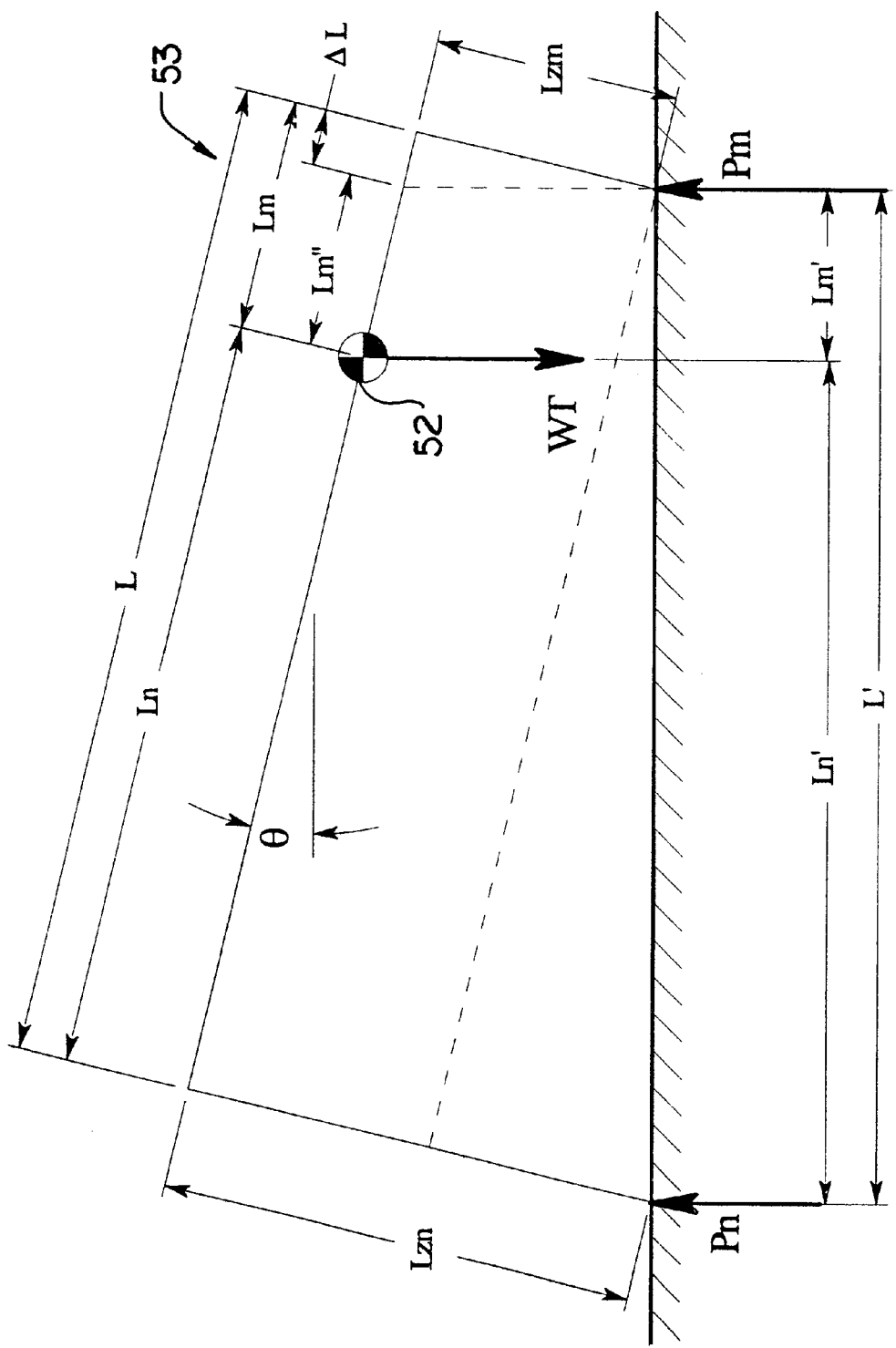
FIG. 2 is a force diagram illustrating the dimensions that must be taken into account for determining aircraft CG for an inclined aircraft.

FIG. 2 illustrates a force diagram 53 representative of an aircraft with a nose-up inclination angle θ. The following symbology is used in FIG. 2:

L: the longitudinal distance between the nose wheel 60 and the wheels in the main landing gear 70 measured along the angle of inclination.

L': the longitudinal distance between the nose wheel 60 and the wheels in the main landing gear 70 measured along the ground.

$L_{zm}$: the vertical position of CG above the main landing gear wheel axle for the aircraft in a level position.

$L_m'$: the horizontal distance between CG and the main landing gear wheel axle.

$L_n'$: the horizontal distance between CG and the nose wheel axle.

It should be understood that typically the value for $L_{zm}$ will be known for this analysis. It has been found that an estimated value for this parameter can be used with good results. An assumed value for the vertical position of CG above the main landing gear wheel axle would be hard coded in a software embodiment of the present invention.

The calculation for an inclined aircraft is a two step process involving first determining the position of CG with respect to the main landing gear in a horizontal plane ($L_m'$) and then determining the position of CG in the aircraft's longitudinal axis. In the first step, the moments about CG are summed as follows:

$$\sum M_{CG} = 0 \qquad (1)$$
$$P_n L_n' = P_m L_m'.$$

Next the quantity L' is determined by:

$$L' = \frac{L}{\cos\theta}.$$

The simple summation:

$$L' = L_n' + L_m'$$

leads to the solving of equation (1) for $L_m'$ as follows:

$$P_n(L' - L_m') = P_m L_m'$$
$$P_n\left(\frac{L}{\cos\theta} - L_m'\right) = P_m L_m'$$
$$\frac{P_n L}{\cos\theta} - P_n L_m' = P_m L_m'$$
$$L_m' = \frac{P_n L}{(P_n + P_m)\cos\theta} = \frac{P_n L}{(WT)\cos\theta}$$

In the second step, the distance $L_m$ in the aircraft's coordinate system is determined using the relationship above for $L_m'$ and the dimensions shown in FIG. 2 as follows:

$$L_m = L_m'' + \Delta L_m$$
$$L_m'' = \frac{L_m'}{\cos\theta}$$
$$\Delta L_m = L_{zm}\tan\theta$$
$$L_m = \frac{L_m'}{\cos\theta} + L_{zm}\tan\theta$$

Substituting for $L_m'$ gives:

$$L_m = \frac{P_n L}{(WT)\cos^2\theta} + L_{zm}\tan\theta$$

This equation, which will be referred to as the "inclined CG equation," relates to the position of aircraft CG along the aircraft's longitudinal axis relative to the main landing gear location based upon the known quantities of aircraft weight, measured nose wheel load, distance between the nose wheel and main landing gear, vertical CG position, and the inclination angle of the aircraft.

It will be readily appreciated by one of ordinary skill that the form of both the level CG equation and the inclined CG equation will not change if the value of $P_n$ and associated horizontal dimension L are measured with reference to a jack point 82 between the nose wheel 84 and the main landing gear 86 or to any point between the front of the aircraft 80 and the main landing gear 86. Further it will be appreciated that the present invention may be practiced by determining the load at any point along the longitudinal axis of the aircraft. This point need not lie exactly on that axis and, in fact, it is presumed that the typical force measuring point may be a few inches away from the longitudinal axis.

Nose Wheel Lever Apparatus

The analysis described above for determining aircraft CG relies upon knowing the load or weight at some point on the aircraft. Desirably that point lies between the front of the aircraft and the main landing gear with the nose wheel or a jack point being a preferred point for doing so. Alternatively, the present invention may be used with a tail wheel or tail strut landing gear arrangement having a single wheel or strut positioned towards the rear of the aircraft. The term "nose wheel" as used herein is defined to include a single wheel or strut positioned in either the forward or the aft end of the aircraft.

Figure 3:
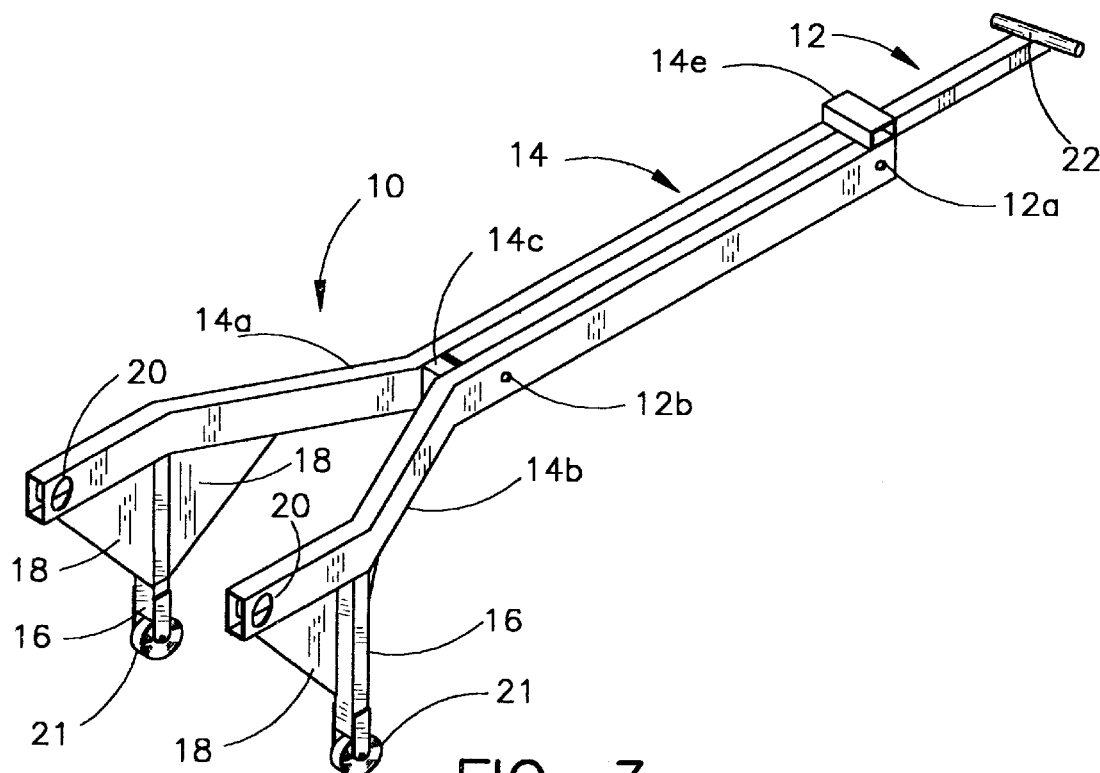
FIG. 3 is a rear perspective view of the lever apparatus of the present invention.
Figure 4:
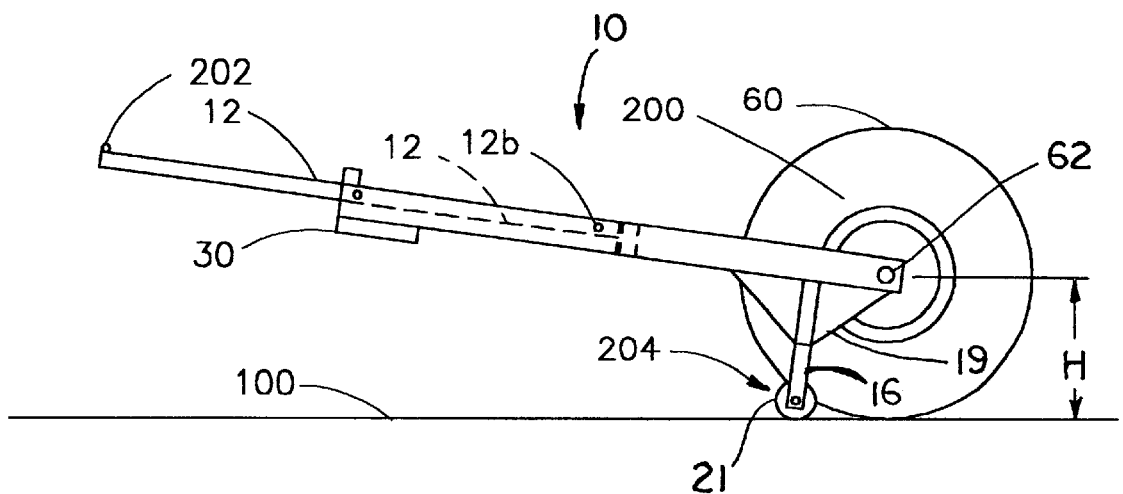
FIG. 4 is a side view of the lever apparatus illustrated in FIG. 3 attached to an aircraft nose wheel prior to the aircraft wheel being raised from the ground to determine aircraft center of gravity.

A suitable lever apparatus 10 for determining nose wheel load is shown in FIGS. 3 and 4. The apparatus 10 relies on a simple principle of a lever and fulcrum and is a Y-shaped or U-shaped device designed to engage and lift the nose wheel from the ground as will be described in more detail below.

Apparatus 10 includes pivot arm 12 having a first end and a second end. The pivot arm 12 is pivotally connected at its first end to frame 14 by pin 12*b*. Pin 12*b* therefore defines a pivot point. A handle 22 is provided at the second end of lever 12 to facilitate the use of apparatus 10 as a tow bar and to maneuver the apparatus into position for attachment to the nose wheel 60. Between the first and second ends of pivot arm 12 pin 12*a* holds pivot arm 12 in a stowed position away from contact with load cell 30 (FIG. 5) when apparatus 10 is not being used to determine aircraft CG. Normally pin 12*a* is removed only when aircraft CG is to be determined or to provide access to load cell 30.

Frame 14 has a forward end located away from the aircraft and an aft end located adjacent the aircraft wheel. The components of frame 14 include first section 14*a*, second section 14*b*, and tie members 14*c*, 14*e* that tie the sections together. Frame sections 14*a*, 14*b* form a Y-shaped or U-shaped yoke for detachable engagement with the aircraft nose wheel 60 at the wheel axle 62. Each frame section is also joined by bridge 14*d* located near the forward end of frame. Holes 20 are provided near the aft end of each section to accept pins (not shown) for attaching apparatus 10 to nose wheel axle 62. Legs 16 extend downwardly from frame sections 14*a*, 14*b* near the aft end of frame to provide a fulcrum at rollers 21 for raising nose wheel 60. The leg to frame connection may be supported by gusset 18 or, as is shown in FIG. 4, strut 19. Different arrangements of such support members may be used depending on the size of aircraft to be serviced. Legs 16 may be detachably secured to frame 14 so as to require less stowage space on an aircraft.

The length of each leg must be greater than the vertical height H (FIGS. 4 and 7) measured from the nose wheel axle 62 to the ground in order to provide a fulcrum. Desirably, legs 16 may be constructed so that their length is adjustable to accommodate nose wheels 60 of various sizes. In a preferred embodiment, legs 16 are positioned forward of nose wheel axle 62 at a distance of between about 6 in. and about 8 in so that the lever apparatus fulcrum is located forward of the wheel axle. Other dimensions may be used depending on the size of the aircraft. As shown in FIG. 4, the length of legs 16 causes lever apparatus 10 to have a slightly upward inclination when initially attached to nose wheel axle 62. Each leg 16 may be provided with roller 21 so that the apparatus may be used with an aircraft that is chocked. Prudent safety practices and FAA regulations require that an aircraft's wheels be chocked during loading and determination of CG. It will be readily appreciated that if rollers 21 are not provided, as a downward force 202 is exerted on lever apparatus 10 near handle 22, the aircraft would tend to be pulled forward because legs 16 are positioned forward of wheel axle 62. The provision of some type of roller is not essential to the practice of the present invention. Nevertheless, a roller device facilitates use of the lever apparatus with aircraft having chocked wheels.

While the apparatus illustrated in FIGS. 3 and 4 and described hereinabove attaches to the nose wheel for lifting purposes, it should be appreciated that attachment to the nose wheel is only one approach. Some planes are provided with jack points, and the lever apparatus could be provided with some type of fitting that connects to such ajack point. It is only necessary to the invention that there be a connector of some kind for securely attaching the aft end of the lever to the aircraft to lift the third ground engaging member (wheels 60 in FIG. 4).

Figure 5:
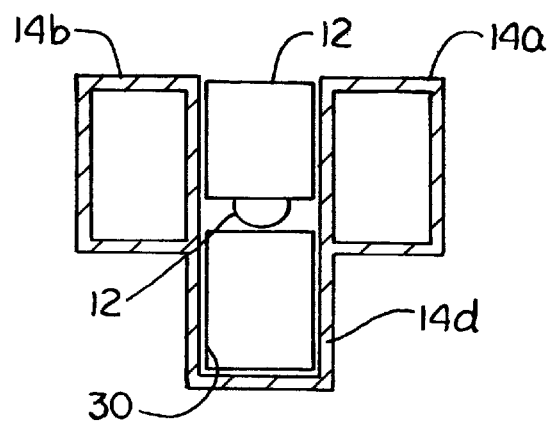
FIG. 5 is a sectional view taken along 5—5 in FIG. 4 showing the position of the bridge that joins first and second frame sections and provides a mounting point for the load cell.

FIG. 5 is a sectional view taken along 5—5 in FIG. 4 and illustrates the manner in which bridge 14d joins frame sections 14a, 14b just below pin 12a. The lower edge of bridge 14d extends below the lower edge of frame sections 14a, 14b so as to form a slot for receiving pivot arm 12. Load cell 30 is mounted on bridge so as to be positioned directly below lever 12. A suitable load cell for the practice of the present invention, a Model 1040 Class E, is available from Tedea Huntleigh. This is a low profile, off-center load cell that produces an output voltage signal that varies with the amount of force exerted on the cell. Other load cells having different measurement ranges may be substituted depending on the size of the aircraft and the signal processing preferences.

Figure 10:
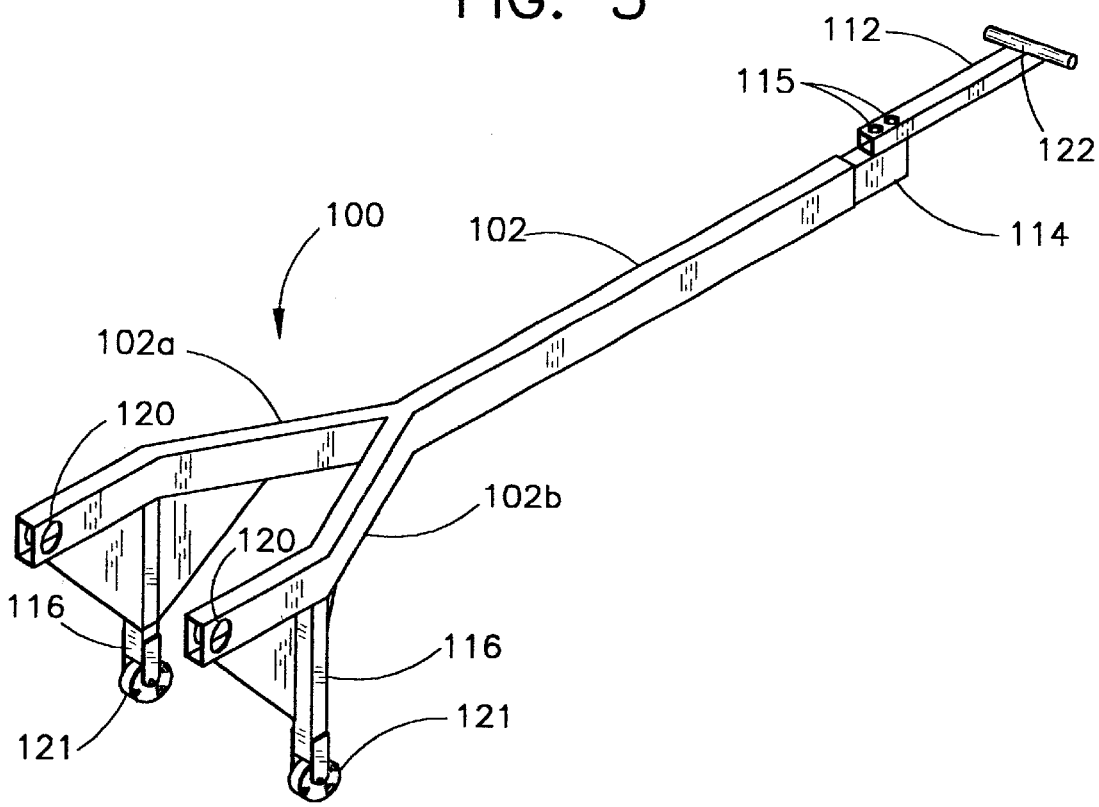
FIG. 10 is a perspective view of an alternative embodiment of the lever apparatus of the present invention.

An alternative lever apparatus 100 is illustrated in FIG. 10. The lever apparatus 100 has a generally Y-shaped configuration and includes a lever member 102 having two angular sections 102a, 102b. These sections include openings 120 for receiving a pin for engagement with an aircraft nose wheel. Legs 116 extend downwardly from angular sections 102a, 102b and are equipped with rollers 121 which function as described hereinabove. Lever member 102 further includes a front arm 112 which is operatively connected to a load cell 114 which is secured to lever member 102. A handle 122 is secured to front arm 112 to provide a point for applying a downward force on lever apparatus 100 so as to raise one of the aircraft wheels from the ground.

Figure 11:
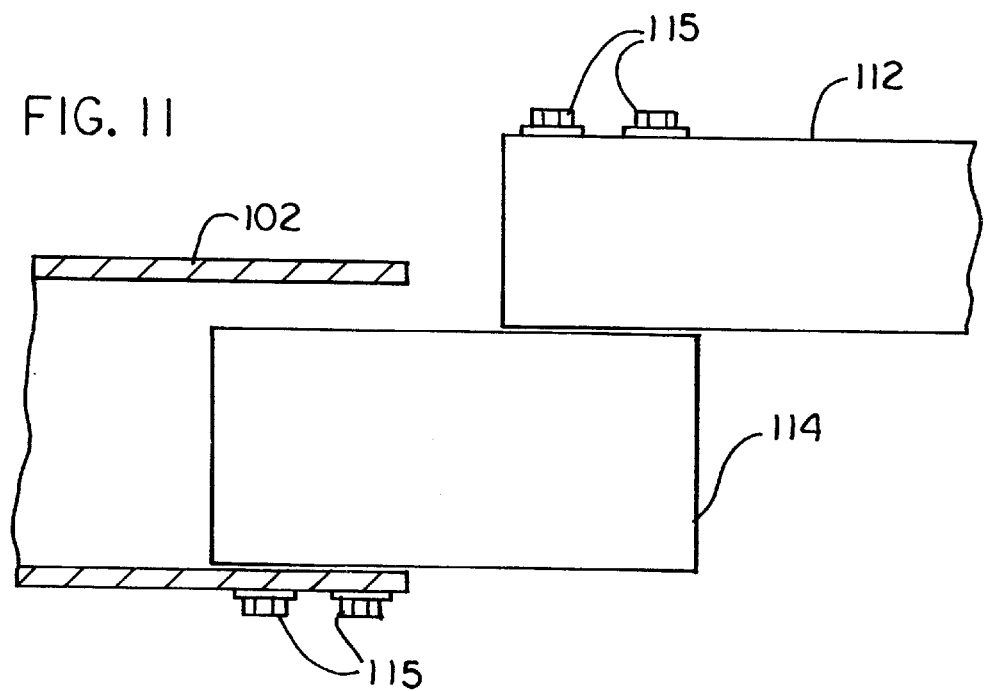
FIG. 11 is a partial sectional view of the load cell mounting on the alternative embodiment depicted in FIG. 10.

Turning now to FIG. 11, the lever member 102 may be comprised of a rigid tube in which is secured the load cell 114 with bolts 115. Front arm 112 is secured to the load cell housing so that the three items form a continuous lever for the purposes of the present invention. It will be readily appreciated that when a downward force is applied to the end of the lever apparatus 100, the load cell 114 will measure the reactive load on the lever apparatus 100. Using the analysis describe above, the reactive load at this point may be related to the load on the aircraft wheel that has been raised from the ground.

The load cell arrangement used in a particular lever apparatus 100 is not limited to the embodiments described above. As will be readily appreciated by one of ordinary skill, various other structural arrangements for mounting a load cell or some other type of load measuring device may be used in the practice of the present invention. That is, the load cell is mounted on the frame so as to generate a signal indicative of the reactive force generated on the frame at a point between the forward end and the aft end as one of the aircraft wheels is raised.

In an alternative lever apparatus arrangement (not shown), the lever fulcrum point is located aft of the nose wheel axle. The downwardly extending legs 16 would be attached to frame sections 14a, 14b at a point aft of the axle so that, when an upwardly directed force is exerted on the end of the lever apparatus, the wheel would be raised from the ground. Measurement of a reactive load in the lever apparatus, and conversion of that information into wheel load information, would be carried out substantially as describe above with appropriate adjustments for the location of the fulcrum point. These calculations are within the ability of one of ordinary skill.

Referring to FIG. 1, the practice of the present invention in an alternative embodiment may include raising one of the aircraft wheels 60, 70 indirectly. For aircraft having a tricycle landing gear arrangement, a downward force may be applied at a point on the aircraft on the opposite side of the main landing gear 70 away from the nose wheel 60. This downward force 90 could be applied at a convenient point such as a jack point and increased steadily until the nose wheel 60 was raised from the ground. The amount of force required to do so would be measured and related to the location of aircraft center of gravity 52. It will be readily appreciated that the horizontal distance between the point at which the force 90 is applied and the main landing gear may be measured readily. Similar moment summing calculations would be carried out as described above to relate the downward force required to raise the nose wheel 60 to the location of aircraft CG.

It will be readily appreciated that in the broadest sense of the invention, an upward or downward force may be applied to any suitable point on the aircraft 50 such that one of the wheels is raised from the ground. The quantity and lateral spacing of this force from the main landing gear may be related to aircraft CG using appropriate moment summation techniques as described herein above.

Determining Nose Wheel Load

Figure 7:
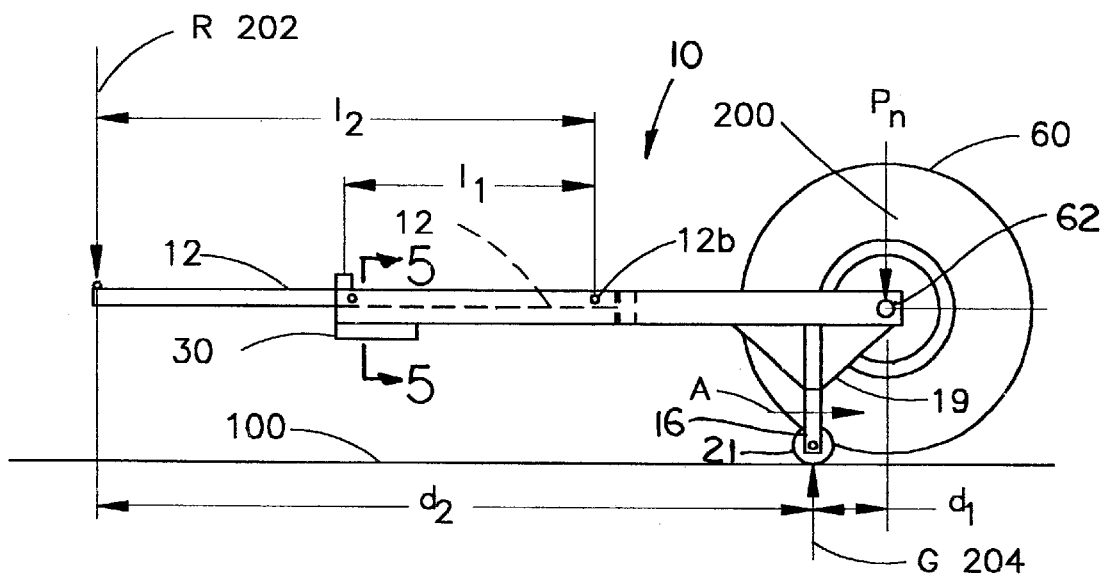
FIG. 7 is a side view of the lever apparatus illustrated in FIG. 4 after the aircraft wheels have been raised from the ground by applying a downward force to pivot arm and the lever apparatus frame is in a level position for determining aircraft center of gravity.

FIG. 7 illustrates the use of the lever apparatus 10 to determine nose wheel load. A downward force R has been applied to the second end of pivot arm 12 so as to push the pivot arm downward to engage load cell 30 and to raise nose wheel 60. Pivot arm 12 is cantilevered from pivot pin 12b as it is subjected to downward force R. This force is continued until the aircraft nose wheel 60 has been raised completely from the ground and the frame 14 is level. A well-known bubble-type level may be provided atop frame 14 to indicate that frame is in a level condition. It will be readily appreciated that wheels 21 will travel in the direction of arrow A as nose wheel 60 is raised from the ground 100. The location of the fulcrum point about which lever apparatus 10 operates is indicated by arrow 204. Load cell 30 generates a signal proportional to the load created by pivot arm 12 at a point approximately below pin 12a.

It should be understood that although lever apparatus 10 has been described as being comprised of pivot arm 12 and frame 14, while in use these components act as a single continuous lever operating about fulcrum point 204.

The load diagram elements in FIG. 7 illustrate the analysis for relating nose wheel load 200 to load cell output. The following symbology is used in this analysis:

$d_1$: the horizontal distance between the nose wheel axis and the fulcrum point 204.

$d_2$: the horizontal distance between fulcrum point 204 and applied force R.

$l_1$: the horizontal distance between pivot pin 12b and load cell 30.

$l_2$: the horizontal distance between pivot point 12b and applied force R.

L: the reactive force measured at load cell 30.

$P_n$: nose wheel load.

Turning first to the pivot arm 12, and summing the moments about pivot pin 12b:

$$(L)(l_1)=(R)(l_2)$$

$$R=L(l_1/l_2)$$

Next, considering the forces on the entire apparatus, the moments about fulcrum point 204 are summed:

$$(P_n)(d_1) = (R)(d_2)$$

$$P_n = R\frac{d_2}{d_1}.$$

Substituting for R from the equation above yields:

$$P_n = L\frac{l_1 d_2}{l_2 d_1},$$

which relates the load cell measured reactive force L to nose wheel load 200 or $P_n$. This value of nose wheel load 200 may be used in the CG equation above to determine aircraft CG.

Method for Determining Aircraft CG

Figure 8:
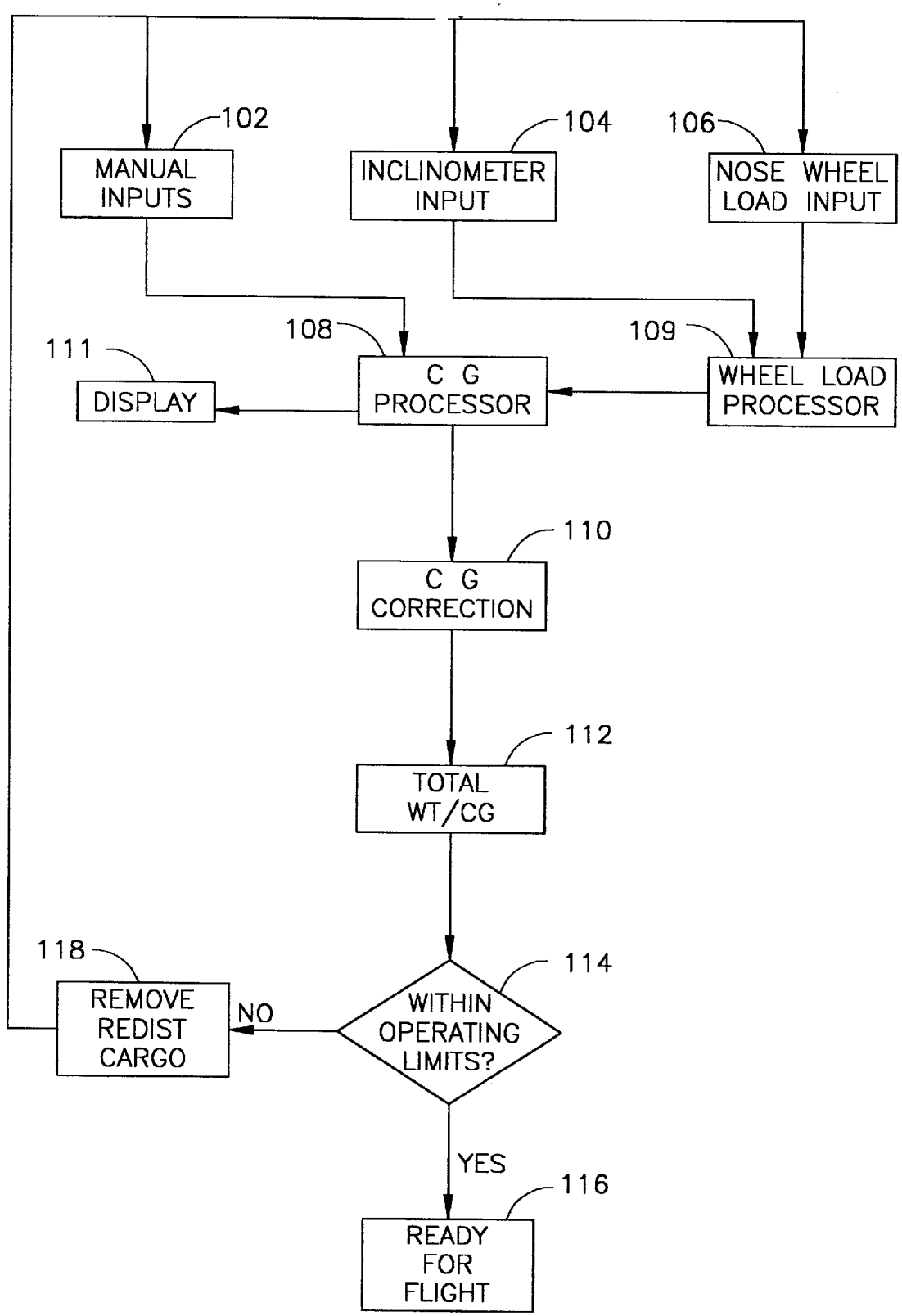
FIG. 8 is a flow chart that illustrates the method and data flow for determining aircraft CG using the system and apparatus of the present invention.

A method for determining aircraft CG is illustrated schematically in the flow chart in FIG. 8. The method includes determining the load on one of a plurality of aircraft wheels, if necessary, determining the aircraft inclination with respect to level, and relating the nose wheel load to the aircraft center of gravity based on the measured aircraft inclination. In a preferred embodiment, the necessary calculations for determining wheel load are carried out in a microprocessor connected to load cell 30. Microprocessor receives an electronic input from load cell 30 and at the same time from inclinometer 52 mounted in aircraft 50. The inclinometer 52 measures the angle of inclination θ and converts this information into an electronic signal. These two electronic inputs may be provided to processor simultaneously.

The method begins with aircraft inputs 102, inclinometer input 104, and nose wheel load input 106. The latter two 104, 106 are fed to wheel load processor 109. The aircraft inputs include aircraft empty weight and fuel load. The remaining two inputs 104, 106 may be provided in electronic form directly from inclinometer 64 and load cell 30 via electrical leads connecting these devices directly to processor 109. Alternatively, the output from these devices may be obtained from a numeric display contained in hand held units that are electronically connected to inclinometer 64 and lever apparatus 10. The values shown in the numeric display may then be input via a keyboard or some equivalent into processor 109. The output of wheel load processor 109 is fed to CG processor 108 which generates an initial CG calculation that is then corrected at 110 for any items not yet on the aircraft at the time the CG determination is made. These items could include the pilot weight, the weight of lever apparatus 10, if it is to be stowed onboard during flight, and any other miscellaneous items. Next, a total weight and CG is calculated at 112. At test 114 the results from step 112 are compared to the operating limits for the aircraft as specified in the manufacturer's operating handbook. If the total weight and CG locations are within acceptable parameters, then the aircraft is ready for flight as indicated at 116. If test 114 answers no, then it is necessary to remove or redistribute cargo 118. From that step, the routine returns to input gathering 102, 104, 106. Processor 108 may include its own display 111. Each of the steps 108, 109, 110, 112, 114 may be carried out in a single electronic processor. Separate blocks have been shown in this flow chart solely for the purpose of clarity.

It will be readily appreciated that operating parameters for a variety of aircraft may be stored in an electronic memory location that communicates with processor 108. Thus the method would be initiated by entering the type of aircraft whose CG will be determined so that a CG application running on the computer would access the proper aircraft parameters from a stored database. This method lends itself to recording a history of total weight and CG locations for a number of flights for a particular aircraft. This historical information can be used in a prospective fashion to better determine proper aircraft loading so that acceptable total weight and CG will be achieved on the first loading without having to redistribute or remove cargo from the aircraft.

One of the primary advantages of the present invention is that, for small cargo planes, one person has sufficient strength to exert the required downward force on the lever apparatus 10 to raise nose wheel 60 from the ground using lever apparatus 10. It is believed that the invention is also suitable for much larger aircraft that can be accommodated by increasing the size and structural load bearing capability of lever apparatus 10. For these much larger aircraft, it may be necessary to use an item of aircraft handling equipment to exert the downward force required to raise nose wheel 60. Nevertheless, the operating principle of such a scaled-up version would remain the same.

Figure 9:
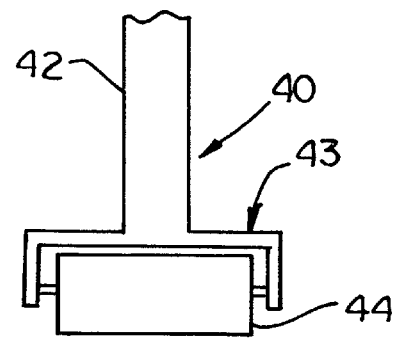
FIG. 9 is a partial elevational view of an alternative embodiment of a single leg for use with the lever apparatus.

Various modifications to the lever apparatus 10 will be apparent to one of ordinary skill. For example, the embodiment shown in FIG. 3 shows two legs 16 extending downwardly from frame 14. In an alternative embodiment, a single leg may be provided extending downwardly from the frame at the approximate location of tie member 14C. A partial elevational view of such a single leg is shown in FIG. 9. The single leg 40 includes a downwardly extending leg member 42 that includes at its lower end a roller housing 43 to which is secured a wide roller 44. In this single leg embodiment, the width of roller 44 typically is several times wider than that of roller 21 used in the 2-leg embodiment. The extra width provides more stability for lever apparatus 10.

The method and apparatus of the present invention provide other advantages over prior art methods for determining aircraft center of gravity. There is no need to locate potentially fragile load cells in aircraft landing gear oleo struts. Such strut-mounted systems have encountered numerous problems. Moreover, avoiding the landing gear cell placement eliminates any variations in accuracy caused by structural changes in the aircraft landing gear as the aircraft ages.

The lever apparatus 10 of the present invention is lightweight, may be carried and operated by one person for small cargo aircraft, and may be stowed onboard the aircraft after each use. Some of the components such as the legs 16 may be disassembled from the frame 14 to take up less space on an aircraft. With the legs 16 removed from frame 14 and pivot arm 12 locked in a stowed position the lever apparatus 10 may serve as a tow bar. Alternatively, the lever apparatus embodiment illustrated in FIG. 10 is particularly suited for use as a tow bar.

Another advantage of the present invention is that it does not require any type of hydraulic connection to an aircraft landing gear. These connections are expensive and, to the extent that they require tapping into existing hydraulic lines and cylinders, create many opportunities for bothersome leaks. The lever apparatus of the present invention is completely independent of all aircraft hydraulic systems and does not require the plurality of pressure transducers seen in the prior art.

The present invention further provides other advantages not mentioned here but which would be readily apparent to one of ordinary skill. The scope and practice of the present invention includes those advantages.

The entire method of determining aircraft weight and CG may be automated to varying degrees. For example, data concerning empty aircraft weight and various fuel loads for a number of aircraft may be stored in a memory device that is linked electronically to processor 108 so that this information need not be looked up in manuals for each CG determination. Alternatively, the operator may use a keyboard to enter the aircraft type, cargo load appropriate fuel load, and any other miscellaneous information concerning aircraft load to determine aircraft weight and CG location.

A lower cost approach would include the use of manual tables or calculations to determine CG location after wheel load is determined using the lever apparatus 10 along with a wheel load processor. In this manual embodiment inclinometer would not generate a signal indicative of aircraft inclination but would provide a visual output that is read by an operator. The practice of the present invention includes a variety of combinations of manual and electronic data input for CG determination.

It should be understood that the headings used herein are for the purposes of organization and convenience and should not be construed to limit the present invention in any way. Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What is claimed is:

1. A method for determining the location of the longitudinal center of gravity of an aircraft of the type having a landing gear arrangement including a pair of transversely spaced apart main landing gear units and a third ground support member located substantially on the longitudinal axis of the aircraft forward or aft of the main landing gear units, said method comprising the steps of:
   a. determining total aircraft weight;
   b. applying a force to the aircraft at a selected point located substantially along the aircraft longitudinal axis so as to raise the third ground support member from the ground;
   c. from a point not in or on the aircraft determining the force applied on the selected point; and
   d. relating the amount of the force applied on the selected point and total aircraft weight to the aircraft center of gravity so as to determine the longitudinal position of the aircraft center of gravity.

2. The method of claim 1 wherein the aircraft is substantially level and wherein the amount of the force applied on the selected point is related to the aircraft center of gravity location according to the relationship:

$$L_m = L/(1+(P_m/P_n))$$

wherein
   L equals the horizontal distance between the main landing gear units and the selected point;
   $L_m$ equals the horizontal distance between the center of gravity and the main landing gear units;
   $P_m$ equals the load on the main landing gear; and
   $P_n$ equals the force applied on the selected point when the third ground support member has been lifted from the ground.

3. The method of claim 1 wherein the aircraft is inclined at an angle of inclination and further includes the steps of
   a. determining the angle of inclination of the aircraft; and
   b. wherein the force applied on the selected point is related to the aircraft center of gravity location according to the relationship:

$$L_m = \frac{P_n L}{(WT)\cos^2\theta} + L_{zm}\tan\theta$$

where
   WT equals total aircraft weight;
   $P_n$ equals the force applied on the selected point when the third ground support member has been lifted from the ground;
   θ equals aircraft angle of inclination;
   L equals the horizontal distance between the main landing gear units and the selected point;
   $L_{zm}$ equals the vertical position of CG above the main landing gear units; and
   $L_m$ equals the horizontal distance between CG and main landing gear units.

4. A method for determining the location of the longitudinal center of gravity of an aircraft of the type having a landing gear arrangement including a pair of transversely spaced apart main landing gear units and a third ground support member located substantially on the longitudinal axis of the aircraft forward or aft of the main landing gear units, said method comprising the steps of:
   a. initially determining the aircraft inclination;
   b. initially determining total aircraft weight;
   c. attaching a lever apparatus to a selected lifting point located substantially on the longitudinal axis of the aircraft;
   d. determining the horizontal distance between the selected lifting point and the main landing gear wheels;
   e. lifting the third ground support member from the ground using the lever apparatus by applying a force to one end of the apparatus;
   f. measuring a reactive load at a point along the length of the lever apparatus;
   g. relating the measured reactive load to the load on the nose wheel to determine aircraft nose wheel load; and
   h. relating the nose wheel load to aircraft center of gravity according to the relationship $$L_m = \frac{P_n L}{(WT)\cos^2\theta} + L_{zm}\tan\theta$$

where

WT equals total aircraft weight;

$P_n$ equals the load on the third ground support member when the member has been raised from the ground;

θ equals aircraft angle of inclination;

L equals the horizontal distance between the third ground support member and the main landing gear units;

$L_{zm}$ equals the vertical position of CG above the main landing gear units; and $L_m$ equals the horizontal distance between CG and main landing gear.

5. The method of claim 4 wherein measuring aircraft inclination is performed by mounting an inclinometer in the aircraft.

6. The method of claim 5 wherein the inclinometer is adapted to provide an electronic signal indicative of aircraft inclination.

7. The method of claim 5 wherein the inclinometer is adapted to provide a visual indication of aircraft inclination.

8. A method for determining the location of the longitudinal center of gravity of an aircraft of the type having a landing gear arrangement including a pair of transversely spaced apart main landing gear units and a third ground support member located substantially on the longitudinal axis of the aircraft forward or aft of the main landing gear units, at least some of the load being carried by the third ground support member said, method comprising the steps of:

a. determining the load on the third ground support member and representing that load as an electronic load signal;

b. determining aircraft inclination at step (a) and representing that inclination as an electronic signal;

c. determining flight specific aircraft data; and d. relating the load signal, the electronic signal representing aircraft inclination and the flight specific aircraft data to aircraft center of gravity according to the relationship $$L_m = \frac{P_n L}{(WT)\cos^2\theta} + L_{zm}\tan\theta$$

where

WT equals total aircraft weight;

$P_n$ equals the load on the third ground support member when the member has been raised from the ground;

θ equals aircraft inclination;

L equals a horizontal distance between the third ground support member and the landing gear units;

$L_{zm}$ equals a vertical position of CG above the main landing gear units; and $L_m$ equals a horizontal distance between CG and the main landing gear units.

9. The method of claim 8 wherein the flight specific aircraft data comprises aircraft weight, cargo weight and fuel weight for a particular aircraft.

10. The method of claim 9 further comprising storing the aircraft weight for a plurality of aircraft in a memory device and accessing the memory device to obtain aircraft weight.

11. The method of claim 8 further comprising providing a display device for displaying at least one of the third ground support member load, aircraft inclination or aircraft center of gravity location.

12. A method for determining the location of the longitudinal center of gravity of an aircraft of the type having a landing gear arrangement including a pair of transversely spaced apart main landing gears and a third ground support member located substantially on the longitudinal axis of the aircraft forward or aft of the main landing gear said method comprising the steps of:

a. determining aircraft empty weight and fuel load;

b. measuring the weight of a load to be carried by the aircraft;

c. measuring aircraft inclination;

d. from a point not in or on the aircraft measuring a load carried by the third ground support member; and e. providing a microprocessor for receiving the aircraft empty weight, fuel load weight, load weight, inclination and ground support member load data and determining the aircraft center of gravity.

13. An apparatus for determining the load on an aircraft wheel having a wheel axle comprising:

a. a lever apparatus having a forward end and an aft end, the aft end adapted for detachable engagement with an aircraft wheel axle wherein the lever apparatus includes a fulcrum point spaced laterally apart from the wheel axle;

b. a load cell mounted on the lever apparatus so as to generate a signal indicative of a reactive force generated on the frame at a point between the forward end and the aft end when the wheel is raised responsive to a force applied to the forward end; and c. a wheel load processor for receiving the load cell signal and determining aircraft wheel load.

14. The apparatus of claim 13 wherein the lever apparatus includes a pivot arm having a first end and a second end, the first end pivotally attached to the lever apparatus at a pivot point located between the forward end and the aft end of the apparatus, wherein the load cell is engaged by the pivot arm upon the application of a force to the forward end of the lever apparatus.

15. The apparatus of claim 14 wherein the processor is adapted to determine aircraft wheel load according to the relationship:

$$P_n = L\frac{l_1 d_2}{l_2 d_1},$$

where $P_n$ equals the load on aircraft wheel;

L equals the load measured on the load cell;

$l_1$ equals the horizontal distance between the pivot point and the load cell;

$l_2$ equals the horizontal distance between the pivot point and the applied force;

$d_1$ equals the horizontal distance between the wheel axle and the applied force; and $d_2$ equals the horizontal distance between the fulcrum and the applied force.

16. The apparatus of claim 13 wherein the fulcrum point is located forward of the wheel axle.

17. The apparatus of claim 13 wherein the fulcrum point is located aft of the wheel axle.

18. The apparatus of claim 13 wherein the fulcrum point comprises at least one downwardly extending leg secured to the frame wherein the leg has a lower end.

19. The apparatus of claim 18 wherein the at least one downwardly extending leg is detachably secured to the frame.

20. The apparatus of claim 18 further comprising a roller secured to the lower end of the at least one downwardly extending leg for permitting movement of the leg when a force is applied to the pivot arm.

21. The apparatus of claim 13 wherein the fulcrum point comprises two downwardly extending legs secured to the frame.

22. The apparatus of claim 13 further comprising a handle attached to the lever apparatus forward end.

23. The apparatus of claim 13 further comprising a display device in electronic communication with the processor for displaying wheel load.

24. A system for determining the center of gravity of an aircraft having a plurality of landing gear wheels including a set of main landing gear wheels and a longitudinally spaced nose wheel or strut located forward or aft of the main landing gear wheels, the system comprising:
   a. a lever apparatus for determining a load carried by the longitudinally spaced nose wheel or strut including;
      i. a frame having a forward end and an aft end, and adapted for detachable engagement with one of the nose wheel or strut;
      ii. a fulcrum point about which the lever apparatus raises the aircraft wheel;
      iii. a load cell mounted on the frame and adapted to generate a signal indicative of a reactive force generated on the frame at a point between the forward end and the aft end when the nose wheel or strut is raised; and
   b. a processor for receiving the load cell signal and determining therefrom wheel load, receiving aircraft inclination information, receiving flight data and relating wheel load, aircraft inclination and flight data to aircraft center of gravity.

25. The system of claim 24 wherein the lever apparatus further comprises a pivot arm having a first end and a second end, the first end pivotally attached to the frame at a pivot point located between the forward end and the aft end of the frame wherein the pivot arm rotatably engages the load cell when a load is applied to the lever apparatus so as to raise one of the nose wheel or strut.

26. The system of claim 24 further comprising an inclinometer mounted on the aircraft for determining aircraft inclination and supplying aircraft inclination information to the processor.

27. The system of claim 24 wherein the flight data comprises at least one of aircraft weight, fuel weight and cargo weight for a particular aircraft.

28. The system of claim 24 wherein the flight data for a variety of different aircraft is stored in a storage device in electronic communication with the processor.

29. The system of claim 24 further comprising a display device in electronic communication with the processor for displaying at least one of aircraft weight, aircraft inclination, wheel load or aircraft center of gravity location.

30. A method for determining the location of the longitudinal center of gravity of an aircraft of the type having a landing gear arrangement including a pair of transversely spaced apart main landing gear units and a third ground support member located substantially on the longitudinal axis of the aircraft forward or aft of the main landing gear units, said method comprising the steps of:
   a. determining total aircraft weight;
   b. determining a load at a selected point located substantially along the aircraft longitudinal axis separate from the main landing gear units so as to maintain equilibrium abut a lateral axis;
   c. relating the amount of the load at the selected point and total aircraft weight to the aircraft center of gravity so as to determine the longitudinal position of the aircraft center of gravity.

31. The method of claim 30 wherein the aircraft is substantially level and wherein the amount of the load on the selected point is related to the aircraft center of gravity location according to the relationship:

$$L_m = L/(1+(P_m/P_n))$$

wherein
   L equals the horizontal distance between the main landing gear units and the selected point;
   $L_m$ equals the horizontal distance between the center of gravity and the main landing gear units;
   $P_m$ equals the load on the main landing gear; and
   $P_n$ equals the load at the selected point
   L equals the horizontal distance between the main landing gear units and the selected point;
   $L_{zm}$ equals the vertical position of CG above the main landing gear units; and
   $L_m$ equals the horizontal distance between CG and main landing gear units.

32. The method of claim 30 wherein the selected point is the third ground support member which is placed on a load cell to determine the load.

33. The method of claim 32 wherein measuring aircraft inclination is performed by mounting an inclinometer in the aircraft.

34. The method of claim 33 wherein the inclinometer is adapted to provide an electronic signal indicative of aircraft inclination.

35. The method of claim 34 wherein the inclinometer is adapted to provide a visual indication of aircraft inclination.

36. The method of claim 30 wherein the aircraft is inclined at an angle of inclination and further includes the steps of
   a. determining the angle of inclination of the aircraft at the time the load is determined;
   b. wherein the load on the selected point is related to the aircraft center of gravity location according to the relationship:

$$L_m = \frac{P_n L}{(WT)\cos^2\theta} + L_{zm}\tan\theta$$

where
   WT equals total aircraft weight;
   $P_n$ equals the load on the selected point when the third ground support member has been lifted from the ground;
   θ equals aircraft angle of inclination;
   L equals the horizontal distance between the main landing gear units and the selected point;
   $L_{zm}$ equals the vertical position of CG above the main landing gear units; and
   $L_m$ equals the horizontal distance between CG and main landing gear units.

37. A method for determining the location of the longitudinal center of gravity of an aircraft of the type having a landing gear arrangement including a pair of transversely spaced apart main landing gear units and a third ground support member located substantially on the longitudinal axis of the aircraft forward or aft of the main landing gear units, the aircraft being inclined at an angle of inclination, said method comprising the steps of:

a. determining a load on the third ground support member and representing that load as an electronic load signal;

b. determining the aircraft inclination and representing that inclination as an electronic signal;

c. determining flight specific aircraft data; and d. relating the load signal, the inclinometer signal and the aircraft data to the longitudinal aircraft center of gravity according to the relationship $$L_m = \frac{P_n L}{(WT)\cos^2\theta} + L_{zm}\tan\theta$$

where

WT equals total aircraft weight;

$P_n$ equals the load on the third ground support member when the member has been raised from the ground;

$\theta$ equals aircraft inclination;

L equals the horizontal distance between the third ground support member and the landing gear units;

$L_{zm}$ equals the vertical position of CG above the main landing gear units; and $L_m$ equals the horizontal distance between CG and the main landing gear units.

38. The method of claim 37 wherein the aircraft data comprises aircraft weight, cargo weight and fuel weight for a particular aircraft.

39. The method of claim 38 further comprising storing the aircraft weight for a plurality of aircraft in a memory device and accessing the memory device to obtain aircraft weight.

40. The method of claim 37 further comprising providing a display device for displaying at least one of third support member load, aircraft inclination or aircraft center of gravity location.

* * * * *